(12) United States Patent
Cunico et al.

(10) Patent No.: US 11,068,119 B2
(45) Date of Patent: *Jul. 20, 2021

(54) OPTIMIZING AN ARRANGEMENT OF CONTENT ON A DISPLAY OF A USER DEVICE BASED ON USER FOCUS

(71) Applicant: International Business Machines Corporation, Armonk, NY (US)

(72) Inventors: Hernan A. Cunico, Holly Springs, NC (US); Brett Gordon, Cary, NC (US); Harry Hoots, Raleigh, NC (US); Mahesh Reddy, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/837,116

(22) Filed: Dec. 11, 2017

(65) Prior Publication Data

US 2019/0107925 A1 Apr. 11, 2019

Related U.S. Application Data

(63) Continuation of application No. 15/729,689, filed on Oct. 11, 2017.

(51) Int. Cl.
  *G06F 3/0481* (2013.01)
  *G06F 3/0488* (2013.01)
  *G06N 20/00* (2019.01)

(52) U.S. Cl.
  CPC ........ *G06F 3/0481* (2013.01); *G06F 3/04886* (2013.01); *G06F 2203/04803* (2013.01); *G06N 20/00* (2019.01)

(58) Field of Classification Search
  CPC ............... G06F 3/0481; G06F 3/04886; G06F 2203/04803; G06F 9/451; G06F 9/453; G06F 3/0482
  See application file for complete search history.

(56) References Cited

U.S. PATENT DOCUMENTS 5,060,170 A   10/1991   Bourgeois et al.
5,561,753 A   10/1996   Coulombe et al.
(Continued)

FOREIGN PATENT DOCUMENTS

EP   2778879 A2   9/2014

OTHER PUBLICATIONS

Dragunov, Anton N. et al., "TaskTracer: A Desktop Environment to Support Multi-tasking Knowledge Workers", IUI'05, Jan. 9-12, 2005, 8 pgs.
(Continued)

*Primary Examiner* — Eric J Yoon
(74) *Attorney, Agent, or Firm* — Nicholas D. Bowman; Hunter E. Webb; Keohane & D'Alessandro, PLLC

(57) ABSTRACT

Aspects of the present invention provide an approach for optimizing a presentation of content on a display of a user device for an identified user. Application behavior metrics and user behavior metrics are tracked over time for the particular user based on the applications executing on the user device and the user's interactions with the content presented by each application. Sections of content are assigned a priority based on the collected metrics which identify content sections (i.e., focus areas) most likely relevant to the user. Based on the assigned priorities, content from one or more applications is presented to the user in an optimal manner (e.g., not overlaid or obscured).

14 Claims, 9 Drawing Sheets

(56) References Cited

U.S. PATENT DOCUMENTS

| | | | |
|---|---|---|---|
| 9,250,761 B2 | 2/2016 | Vranjes et al. | |
| 9,274,671 B2 * | 3/2016 | Croft | G06F 3/0481 |
| 9,501,166 B2 | 11/2016 | Shikama et al. | |
| 9,779,475 B2 * | 10/2017 | Park | G06F 3/0481 |
| 2007/0300185 A1 | 12/2007 | Macbeth et al. | |
| 2008/0109714 A1 | 5/2008 | Kumar et al. | |
| 2013/0086481 A1 * | 4/2013 | Balasaygun | G06F 3/0481 |
| | | | 715/745 |
| 2013/0152001 A1 * | 6/2013 | Lovitt | G06F 9/451 |
| | | | 715/765 |
| 2015/0149922 A1 | 5/2015 | Wickramasuriya et al. | |
| 2015/0227301 A1 | 8/2015 | VanBlon et al. | |
| 2015/0248193 A1 | 9/2015 | Fujioka | |
| 2016/0306531 A1 | 10/2016 | Wong et al. | |
| 2016/0357361 A1 | 12/2016 | Beilis et al. | |
| 2017/0147164 A1 * | 5/2017 | Perez | G06F 3/0482 |

OTHER PUBLICATIONS

Bohmer, Matthlas et al., "A Study on Icon Arrangement by Smartphone Users", CHI 2013, Apr. 27-May 2, 2013, 10 pgs.

Eric Yoon, USPTO Office Action, U.S. Appl. No. 15/729,689, dated May 8, 2019, 17 pages.

Appendix P, "List of IBM Patents or Patent Applications Treated as Related", Mar. 25, 2020, 2 pages.

Eric Yoon, USPTO Final Office Action, U.S. Appl. No. 15/729,689, dated Sep. 12, 2019, 20 pages.

Eric Yoon, USPTO Office Action, U.S. Appl. No. 15/729,689, dated May 12, 2020, 30 pages.

Eric Yoon, USPTO Notice of Allowance, Application U.S. Appl. No. 15/729,689, Notification Date Sep. 14, 2020, 18 pages.

\* cited by examiner

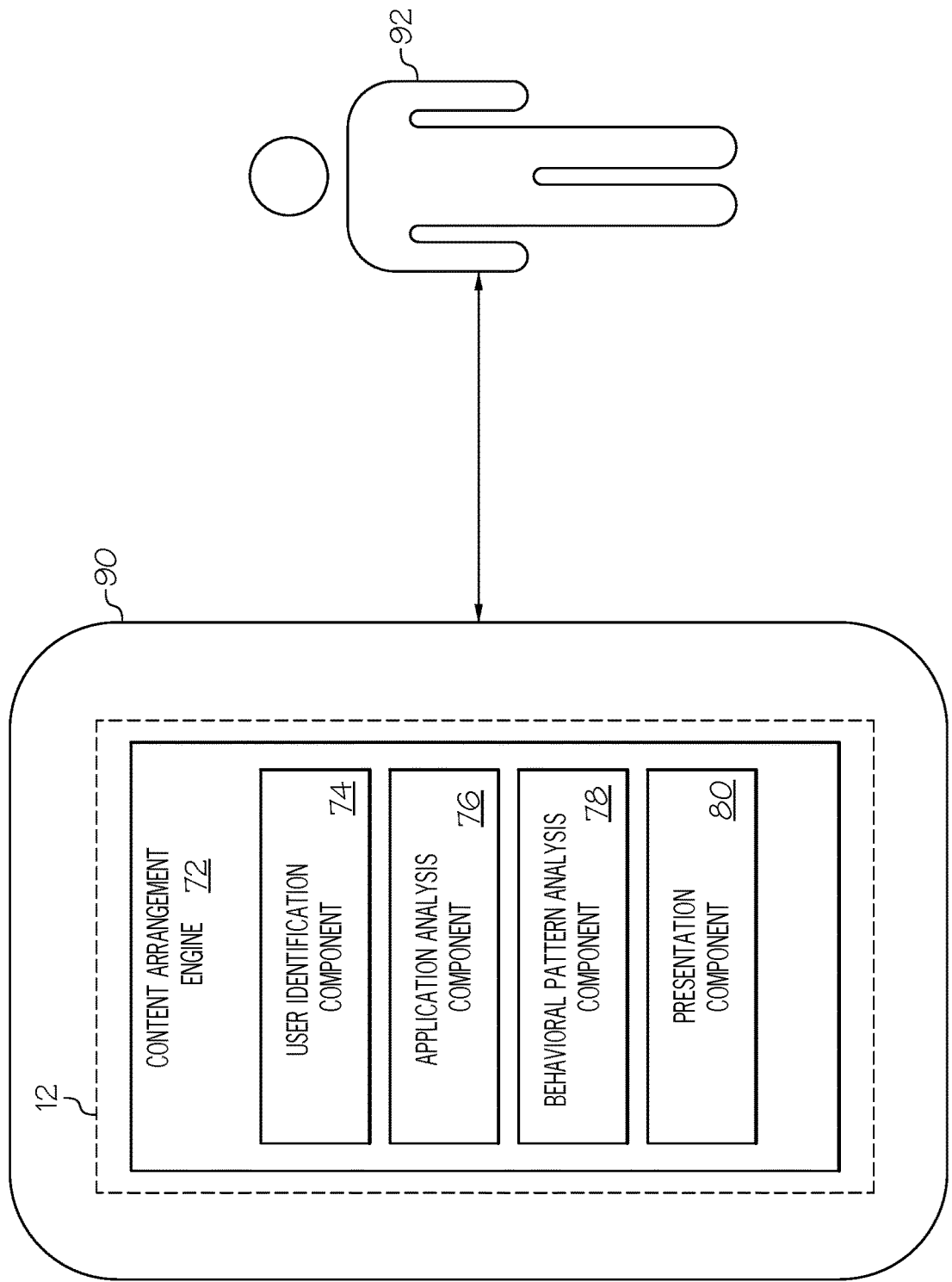

US 11,068,119 B2

OPTIMIZING AN ARRANGEMENT OF CONTENT ON A DISPLAY OF A USER DEVICE BASED ON USER FOCUS

RELATED U.S. APPLICATION DATA

This patent document is a continuation of, and claims the benefit of, co-pending and co-owned U.S. patent application Ser. No. 15/729,689, filed Oct. 11, 2017, the entire contents of which are herein incorporated by reference.

TECHNICAL FIELD

The subject matter of this invention relates generally to content displayed on a display of a user device. More specifically, aspects of the present invention provide a solution for optimizing a presentation of content on a display of a user device for an identified user.

BACKGROUND

In the information technology (IT) environment of today, computer technology is continuously advancing, resulting in modern computer systems which provide ever-increasing performance. One result of this improved performance is an increased use of computer systems by individuals in a wide variety of business, academic, and personal pursuits. The increased performance of computer systems, as well as a reduced cost of certain hardware components, has allowed individual computer systems to execute multiple applications concurrently. One or more of these multiple applications can be displayed to a user concurrently using separate windows on a display device. Each of these multiple applications can also have multiple content sections displayed on the display device.

The benefits of concurrent display of multiple windows on a display device are numerous. Among these benefits is the ability of the user to look at different content from different applications at the same time. For example, a display device user could have content displayed which correspond to a word processing document, and a spreadsheet document, at the same time that a video conference is in progress, allowing the user to view and switch between the different content.

SUMMARY

In general, aspects of the present invention provide an approach for optimizing a presentation of content on a display of a user device for an identified user. Application behavior metrics and user behavior metrics are tracked over time for the particular user based on the applications executing on the user device and the user's interactions with the content presented by each application. Sections of content are assigned a priority based on the collected metrics which identify content sections (i.e., focus areas) likely most relevant to the user. Based on the assigned priorities, content from one or more applications is presented to the user in an optimal manner (e.g., not overlaid or obscured).

One aspect of the invention provides a method for optimizing an arrangement of content on a display of a user device, comprising: tracking, based on a plurality of applications executing on the user device, a set of application behavior metrics; tracking, based on a plurality of interactions between an identified user and the applications, a set of user behavior metrics to identify one or more focus areas; assigning a priority to the one or more focus areas based on the set of application behavior metrics and the set of user behavior metrics; and presenting, on the display of the user device, the one or more focus areas based on the assigned priority and a full position of each focus area.

Another aspect of the invention provides a system for optimizing an arrangement of content on a display of a user device, comprising: tracking, based on a plurality of applications executing on the user device, a set of application behavior metrics; tracking, based on a plurality of interactions between an identified user and the applications, a set of user behavior metrics to identify one or more focus areas; assigning a priority to the one or more focus areas based on the set of application behavior metrics and the set of user behavior metrics; and presenting, on the display of the user device, the one or more focus areas based on the assigned priority and a full position of each focus area.

Yet another aspect of the invention provides a computer program product embodied in a computer readable medium that, when executed by a computer device, performs a method for optimizing an arrangement of content on a display of a user device, comprising: tracking, based on a plurality of applications executing on the user device, a set of application behavior metrics; tracking, based on a plurality of interactions between an identified user and the applications, a set of user behavior metrics to identify one or more focus areas; assigning a priority to the one or more focus areas based on the set of application behavior metrics and the set of user behavior metrics; and presenting, on the display of the user device, the one or more focus areas based on the assigned priority and a full position of each focus area.

Still yet, any of the components of the present invention could be deployed, managed, serviced, etc., by a service provider who offers to implement optimizing a presentation of content on a display of a user device for an identified user.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a system diagram according to an embodiment of the present invention;

Figure 1:
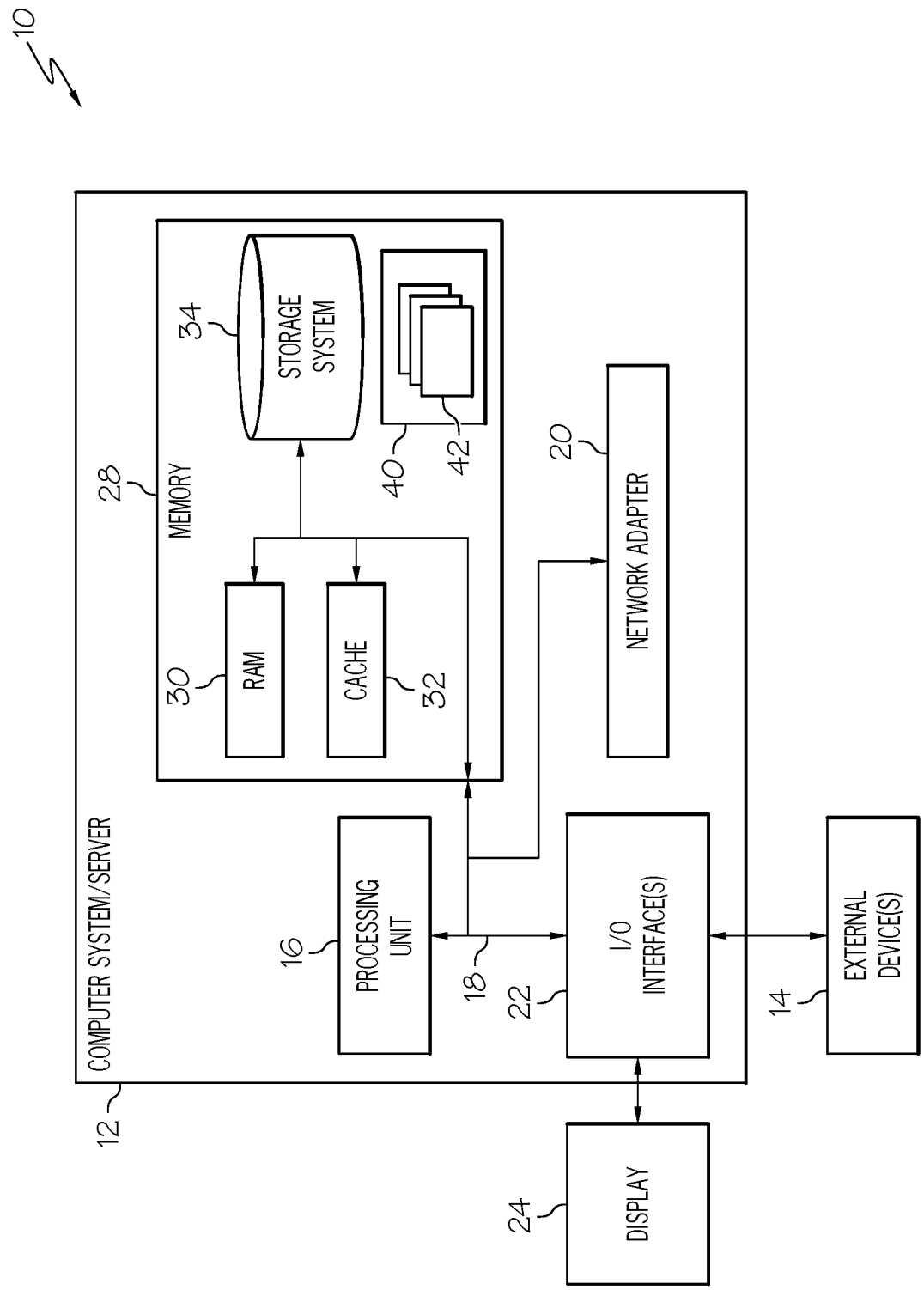
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude of operations, elements, components, and/or groups thereof.

As indicated above, aspects of the present invention provide an approach for optimizing a presentation of content on a display of a user device for an identified user. Application behavior metrics and user behavior metrics are tracked over time for the particular user based on the applications executing on the user device and the user's interactions with the content presented by each application. Sections of content are assigned a priority based on the collected metrics which identify content sections (i.e., focus areas) likely most relevant to the user. Based on the assigned priorities, content from one or more applications is presented to the user in an optimal manner (e.g., not overlaid or obscured).

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a smart device (e.g., smart phones, smart tablets, smart phablets, smart watches, smart bands, smart key chains, etc.), a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Referring now to FIG. 2, a system diagram describing the functionality discussed herein according to an embodiment of the present invention is shown. It is understood that the teachings recited herein may be practiced within any type of networked computing environment (e.g., a cloud computing environment) or wireless communication protocol environment. A stand-alone computer system/server 12 is shown in FIG. 2 for illustrative purposes only. In the event the teachings recited herein are practiced in a networked computing environment (not shown), each user device 90 included need not have content arrangement engine (hereinafter "system 72"). Rather, system 72 could be loaded on a server or server-capable device that communicates (e.g., wirelessly) with user device 90 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to user device 90. Such other system(s) have not been shown in FIG. 2 for brevity purposes.

Along these lines, system 72 may perform multiple functions similar to a general-purpose computer. Specifically, among other functions, system 72 can optimize a presentation of content on a display of a user device 90 for an identified user. To accomplish this, system 72 can include: a user identification component 74, an application analysis component 76, a behavioral pattern analysis component 78, and a presentation component 80.

Referring again to FIG. 2, user 92 is shown interacting with user device 90 according to an embodiment of the invention. In an example, user device 90 can include, but is not limited to, a mobile phone, a smart phone, a digital personal assistant, a laptop computer, a tablet, an e-reader, a desktop computer, a television, a gaming device, and/or the like, accompanied by an associated display for displaying information to user 92 via a display (not shown). In another example, user device 90 can include, but is not limited to, an external device (e.g., a keyboard) which can communicate, either wired or wirelessly, with a smart device (e.g., a smart phone, smart tablet, smart phablet, smart watch, etc.) having an associated display.

In any case, the display used with the present invention may be a liquid crystal device, cathode ray tube, or other display device suitable for creating graphic images and alphanumeric characters (and ideographic character sets) recognizable to the user. It should be noted that the display can have any of a wide range of display resolutions, typically referenced in terms of pixels. A pixel is an individual display location which can be illuminated or otherwise activated on the display device, and can be represented by a unique (x,y) coordinate. Typical display resolutions are 640×480 pixels, 800×600 pixels, 1024×768 pixels, 1280× 1024 pixels, and 3840 pixels×2160 lines (i.e., 4K resolution). It is to be appreciated, however, that the present invention is equally applicable to any display resolution.

The inventors of the invention described herein have discovered certain deficiencies in the current solutions related to multi-window displays, such as the arrangement of content being displayed to a user. Different applications often have different importance to users. For example, during a data and video conference, a user may prefer viewing the other conference participant(s) in a window which is larger than a window displaying less important personal notes being entered by the user.

Additionally, different users may have different preferences or priorities in the arrangement of applications on their display. For example, what is most important to one user may be less important to another. Additionally, individual preferences may affect the content arrangement preferences of users. For example, some may prefer a cascade approach to content, whereas others may prefer a tiled approach.

In addition, the environment of the computer system may be continually changing. That is, applications can be opened and closed. Each of these events can alter the arrangement of content on the display device. For example, an important application may be opened with no area available on the display to place the new content without overlaying other important content.

One current solution for arranging and rearranging content presented on a display device is to let the individual users arrange the application windows manually. That is, the users can re-size windows and "click and drag" windows to new locations themselves. This manual rearranging of windows, however, is an inconvenient and often time-consuming process. This is particularly true when the end user is paying attention to particular content in real time.

Referring again to FIG. 2, user identification component 74 of system 72, as executed by computer system/server 12, is configured to uniquely identify user 92 so that further analysis and results can be associated to that user. In an embodiment, user 92 can be identified based on a user login identification (e.g., username, password, etc.) provided by user 92. In another embodiment, user 92 can be identified based on biometric identification, such as a fingerprint scan, an iris scan, a facial scan, a voice scan, a retinal scan, a hand architecture scan, and/or the like. User login data and/or biometric data provided by user 92 may be compared against previously stored information in order to identify user 92. For example, user 92 may place his finger on a biometric sensor to initiate identification process. The sensor fingerprint may be digitized and compared against a digitized fingerprint stored in a database (e.g., a security database) to determine the identity of user 92.

Application analysis component 76 of system 72, as executed by computer system/server 12, is configured to track a set of application behavior metrics over time based on an analysis of each application as it executes on user device 90. To that end, application analysis component 76 identifies each application executing on user device 90. In an embodiment, a full position (i.e., size and location) of each identified application is determined using a coordinate system. The coordinate system for an application may be based on the coordinate system of the display device. The basic unit of measure is typically the device unit (typically, the pixel). Points on the screen can be described by x- and y-coordinate pairs with x-coordinates increasing to the right and y-coordinates increasing from top to bottom. In an embodiment, application analysis component 76 specifies a full position of an application on display 92 in screen coordinates. For screen coordinates, the origin is typically the upper-left corner of the screen. The full position of an application can be described determining the screen coordinates of two points that define the upper-left and lower-right corners of the application. After a full position of each executing application is determined, how the applications are competing for display space can be determined along with any overlap between the applications.

Figure 3A:
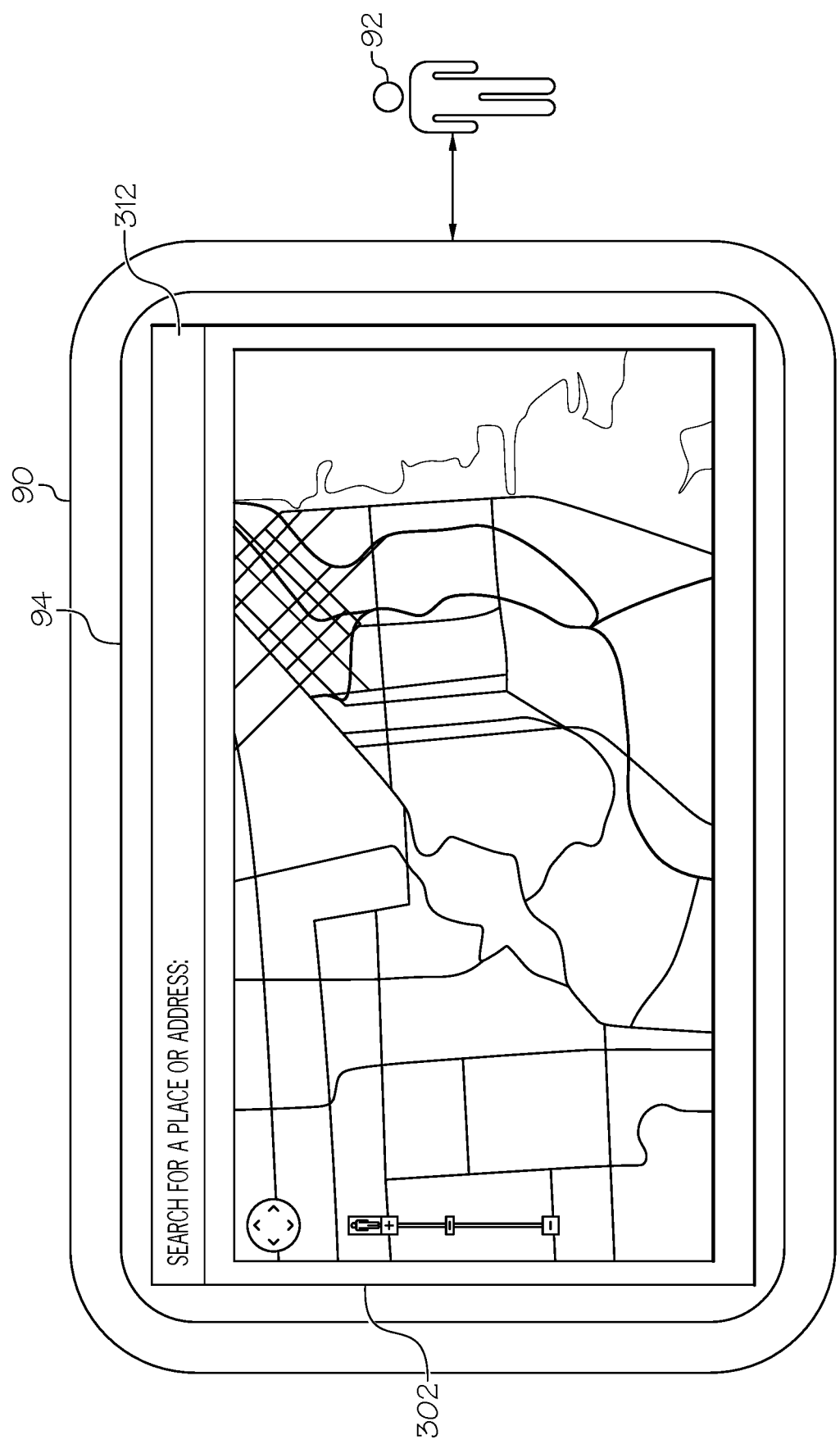
FIG. 3A depicts example content according to an embodiment of the present invention.
Figure 3B:
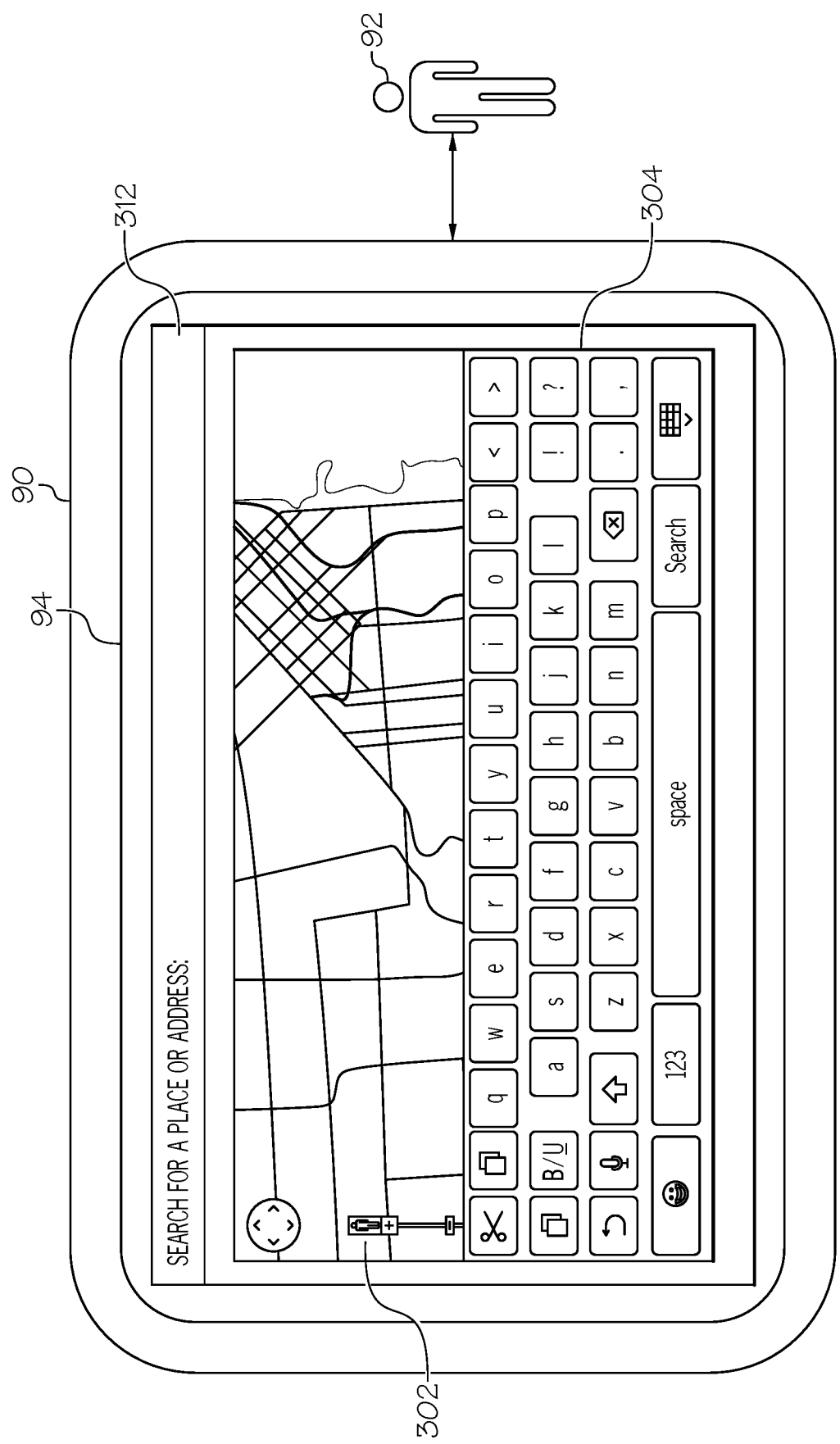
FIG. 3B depicts example content overlaid with separate content according to an embodiment of the present invention.

Application analysis component 76 is further configured to identify any dependencies between each application and other applications executing on user device 90. FIGS. 3A and 3B show an example dependency between two applications according to one embodiment of the present invention. As shown in FIG. 3A, map application 302 is running on user device 90. When user 92 selects search box 312 (e.g., with index finger) (as shown in FIG. 3B) to begin entering a place or address, keyboard application 304 executes so that user 92 can begin entering text in search box 312. In this example, a relationship between map application 302 and keyboard application 304 is identified since certain features (e.g., search feature) of map application 302 are dependent on keyboard application 304 for those features to function.

In another example, a remote desktop application may be executing on user device 90 along with any number of remote applications. Typically, remote applications are presented within a client window associated with the remote desktop application such that resizing and/or repositioning the client window can affect the full position (i.e., size and location) of the remote applications.

In yet another example, a virtual private network (VPN) application may be executing on user device 90 along with any number of remote applications. A typical VPN application includes only a client user interface (UI) window showing connection entries, status, and/or the like. Unlike a remote desktop application, resizing and/or a repositioning the client UI window does not affect the remote applications as the remote applications are not presented within the client UI window., unless the UI is positioned to overlay one or more of the applications.

In still another example, user 92 may be executing a web browser application and a word processing application. Assume user 92 is viewing content on the web browser application and taking notes using the word processing application based on the content. This may be accomplished using one or more known text parsing techniques. In this example, a dependency exists between the two applications although the focus of user 92 may be primarily on the content and not what he/she is typing. Examples of dependencies above are for illustrative purposes only and not intended to be limiting. Other types of application dependencies may be defined.

In an embodiment, application analysis component 76 may be configured to assign a relationship coefficient for each application having a dependency with another application. For example, Application A may be assigned a relationship coefficient as it relates to Application B. Factors influencing the weighting of the relationship coefficient include, but are not limited to, one or more functions of Application A that are reliant on Application B, how resizing and/or repositioning Application B may affect Application A, and/or the like. A higher relationship coefficient may be assigned to Application A as it relates to Application B if either or both of the factors above are satisfied rather than if neither are met.

Behavioral pattern analysis component 78 of system 72, as executed by computer system/server 12, is configured to track a set of user behavior metrics over time based on how user 92 consumes and/or physically interacts with content presented by each application on user device 90. In an embodiment, behavioral pattern analysis component 78 may detect one or more focus areas that user 92 has focus on. As used herein, the term "focus" may include visual interaction (e.g., reading) and/or physical interaction (e.g., touching, clicking, etc.) with displayed content. This can be achieved by a combination of one or more of the following known techniques: mouse/pointer/finger tracking, keyboard strokes, mouse scrolling, use of built-in camera(s) for eye tracking, and/or the like. In any case, application behavioral pattern analysis component 78 identifies content areas from one or more applications garnering attention from user 92 and content not receiving attention.

Based on the gathered interaction information, behavioral pattern analysis component 78 can generate a heat map highlighting areas of content presented on user device 90 having frequent user activity (i.e., focus areas), as well as content areas getting less attention (i.e., non-focus areas) by user 92. In an embodiment, each focus area can be specified by a full position (i.e., size and location) within its respective application. In an example, the full position of a focus area can be specified using points in a window called client coordinates. The origin in this case is the upper-left corner of the respective window or client area. Client coordinates ensure that an application can use consistent coordinate values while drawing in the window, regardless of the position of the window on the display space. The method for specifying a full position of a focus area is illustrative only and not intended to be limiting. Other methods for specifying a full position of a focus area may be employed. Further, each focus area may be assigned an identifier (ID) and heat index value based on a frequency of user interaction.

Figure 4:
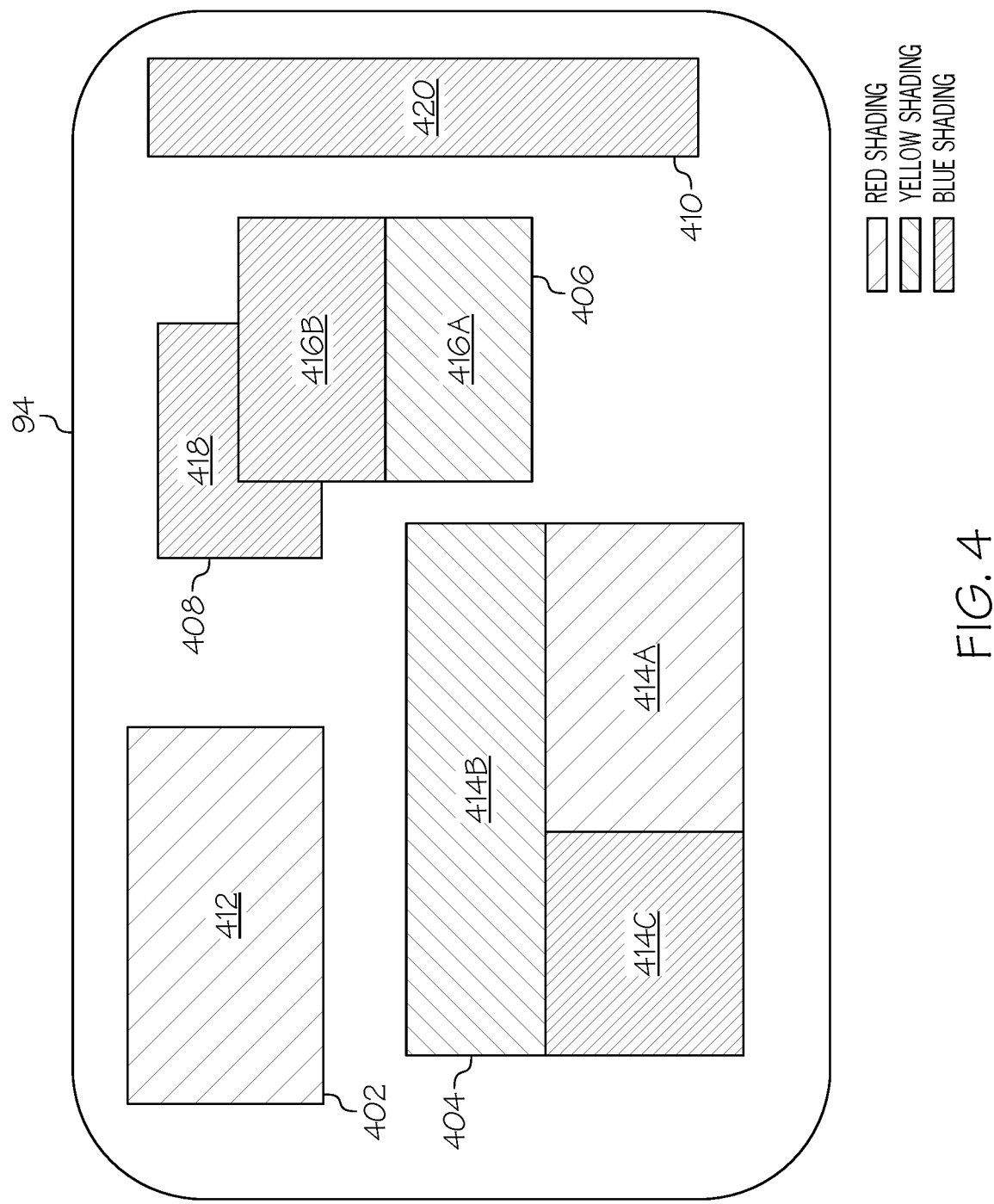
FIG. 4 depicts an example heat map representation according an embodiment of the present invention.

FIG. 4 shows an example heat map where content areas of applications presented on display 94 are categorized (e.g., high focus area, low focus area, non-focus area) and presented based on user focus. Heat maps can be created using a combination of available technologies including mouse and finger tracking, scrolling tracking, as well as leveraging built-in cameras for eye tracking. Over time, this information can identify content areas that are likely more relevant to user 92 than other content areas.

As shown in FIG. 4, display 94 shows application 402, application 404, application 406, application 408, and application 410 with each application competing for space on display 94. Content areas of each application are shown shaded in one of three colors: red for high focus area, yellow for low focus area, and blue for content areas have no user focus. The heat map that is created shows high focus areas 412 and 414A. Areas 414B and 416B are shaded yellow indicating low focus areas. The remaining areas are shaded blue indicating no user activity. In an embodiment, a heat value index may be assigned to each area bead on an activity level.

In an embodiment, behavioral pattern analysis module 78 may further be configured to track how user 92 typically interacts with content with regard to other content. User 92 may focus on particular content presented by one or more applications in a consistent sequence. As used herein, a "workflow" is defined as a focus sequence performed at a frequency exceeding a predefined threshold. For example, user 92 may focus on content in Application B 80% of the time after focusing on content in Application A. Additionally, user 92 may focus on content in Application C 90% of the time after finishing with Application B. If, for example, the threshold is defined at 75%, a workflow of content in Application A→content in Application B→content in Application C may be established.

In addition, behavioral pattern analysis module 78 may monitor and track how user 92 holds and interacts with user device 90 when user device 90 is a portable device such as a smart phone. In an embodiment, behavioral pattern analysis component 78 may, using an arrangement of available sensors, detect that user 92 typically holds user device 90 with one hand or both hands, which hand is dominant, variations depending on device orientation, variations depending on application being used, and/or the like. For example, user 92 may always position user device 90 in a horizontal landscape orientation when interacting with content in a particular application.

In an embodiment, a set of application and user behavior metrics tracked over time may be stored in a repository. The repository may include any number of databases (e.g., relational database), which can be implemented in a combination of hardware (i.e., physical data storage hardware) and software (i.e., relational database software). In an embodiment, a priority may be assigned to each focus area based on application and user behavior metrics that are collected over time. To this extent, system 72 is a computer system that is configured to provide information and/or determine an arrangement of content based on a cumulation of application and/or user behavior metrics. System 72 has self-learning attributes that increase the accuracy of the determinations as more information and/or metrics are provided.

For example, user 92 may interact with a focus area consistently for a short period of time while working on a particular task, but his/her focus on this particular content area may diminish over time resulting in a decrease in priority. A future arrangement of content including this particular content may reflect the priority decrease. In an embodiment, system 72 can include IBM's Watson Analytics or Watson Personality Insights (Watson and IBM are trademarks of International Business Machines Corporation).

Presentation component 80 of system 72, as executed by computer system/server 12, is configured to control how content is presented to user 92. In an embodiment, a set of metrics collected from application analysis component 76 and a set of metrics collected from behavioral pattern analysis component 78 may be used to assign a priority to each identified focus area. In an embodiment, focus areas may be automatically arranged (including the respective applications of each) in optimal manner and presented to user 92.

Figure 5:
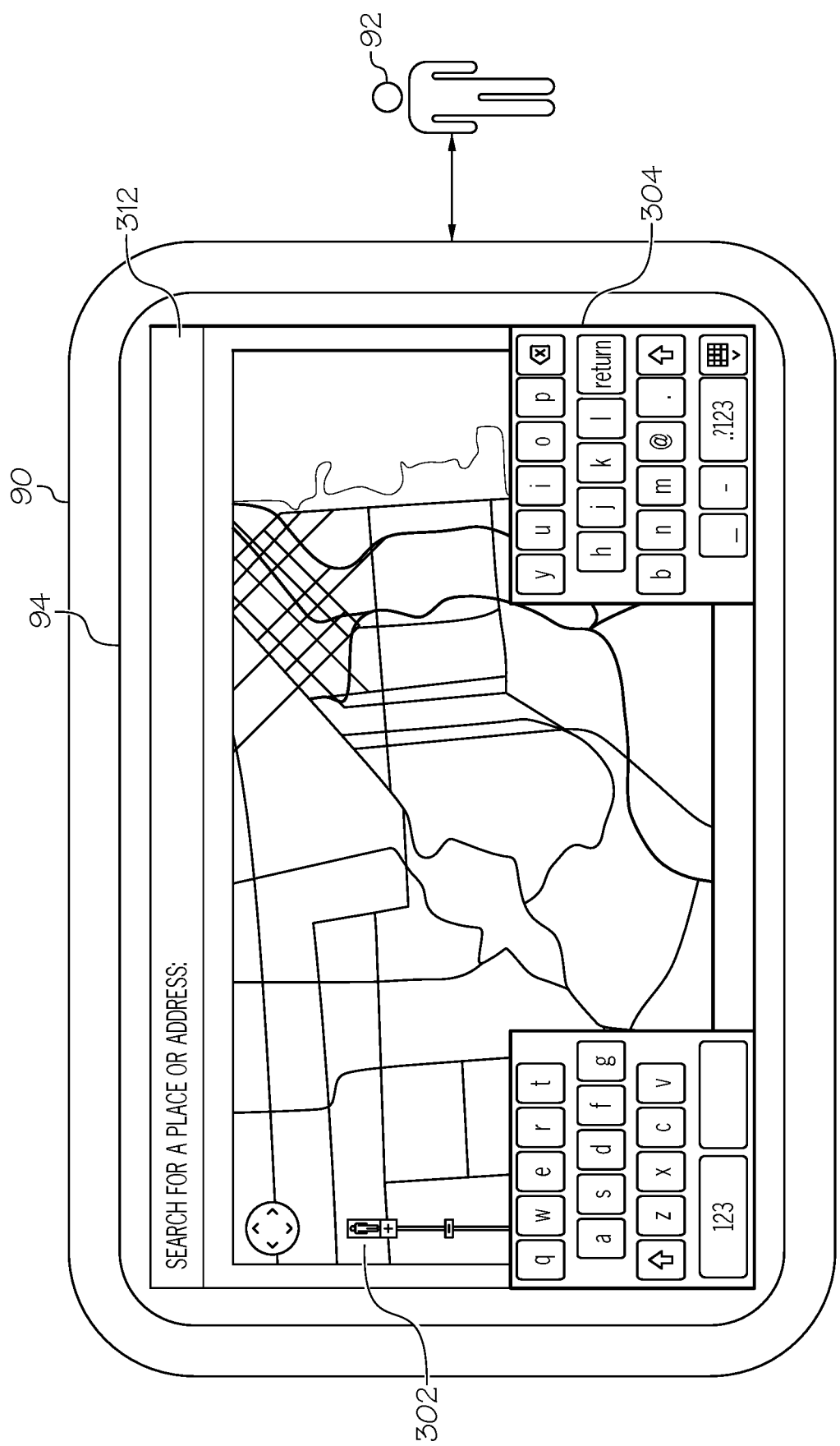
FIG. 5 depicts an example resized and reshaped content according to an embodiment of the present invention.

FIG. 5 shows an example of an optimized arrangement of focus areas so that there is no or minimal overlap. Referring back to FIG. 3B, much of map application 302 became obscured by keyboard application 304 when user 92 wished to enter text to search for a place or address. Assume content from map application 302 and content from keyboard application 304 have been assigned equal priority given the dependent relationship of their respective applications with regard to certain functions. As shown in FIG. 5, keyboard application 304 (i.e., the virtual QWERTY keyboard) has been divided into two non-contiguous sections that are displayed on opposite edges of display 94 so as to not obstruct the user's view of content in map application 302. In another example, the virtual keyboard may be divided so as to not obstruct any focus areas having an equal or higher priority. In any case, content in map application 302 can remain functional by content in keyboard application 304 being resized and reshaped so that a smaller portion of map application 302 is overlaid.

Figure 6A:
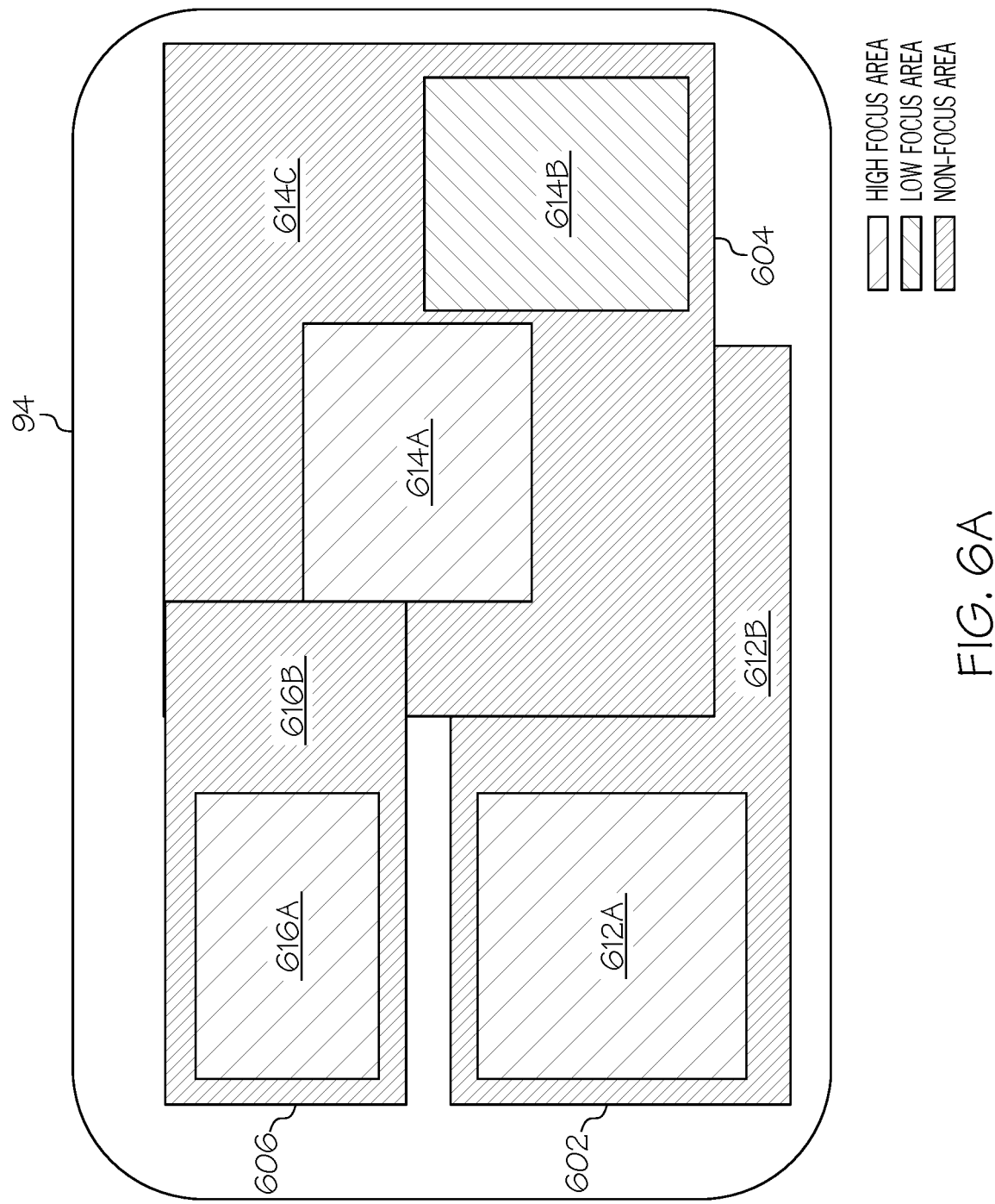
FIG. 6A depicts an example arrangement of applications prior to an optimization of content according to an embodiment of the present invention.
Figure 6B:
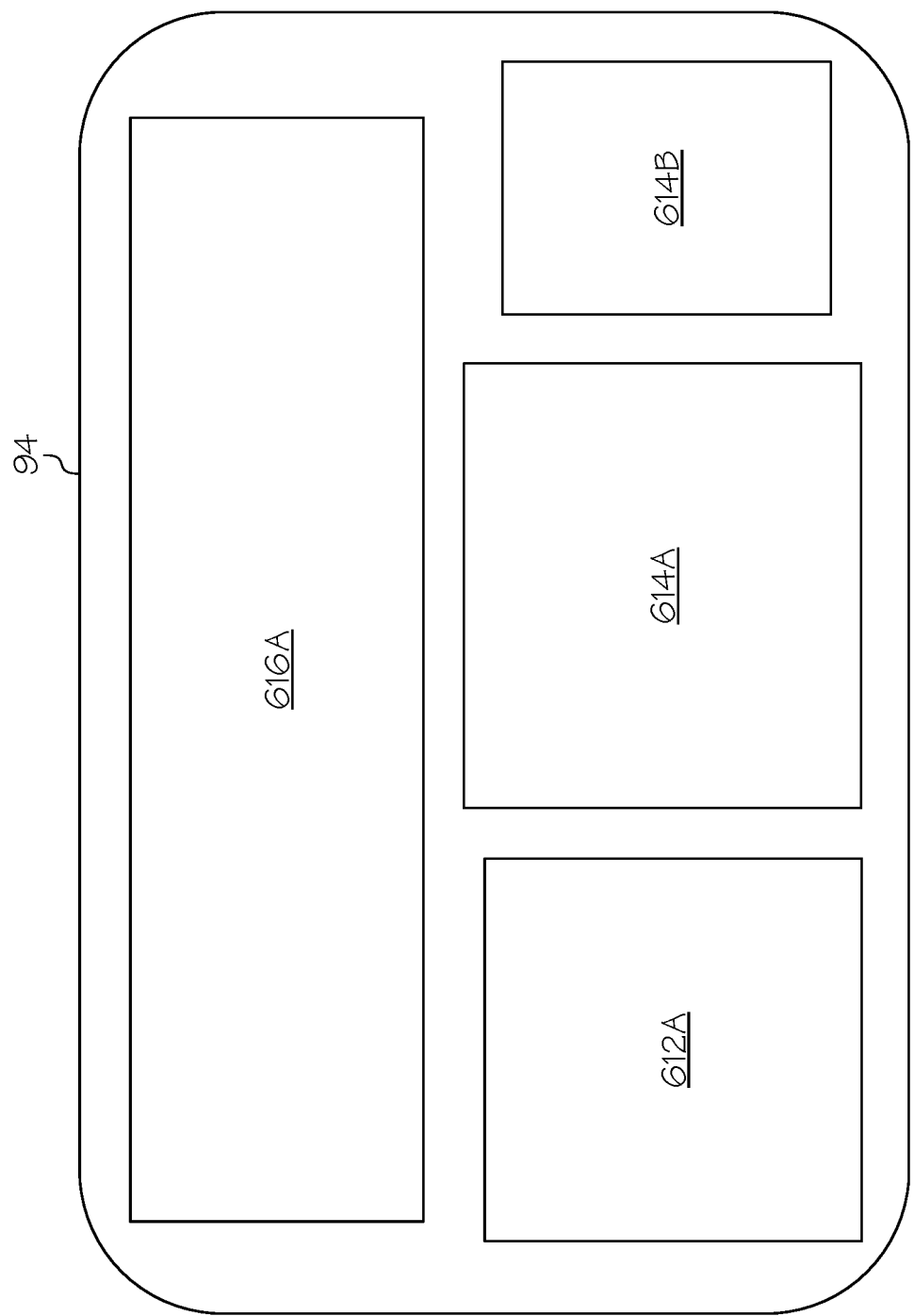
FIG. 6B depicts an example optimized arrangement of content according to an embodiment of the present invention.

FIG. 6A shows an example arrangement of applications prior to an optimization of the content on display 94. As shown, display 94 includes applications 602, 604, and 606. Content areas 612A, 614A, and 616A have been identified as high focus areas. Content area 614B has been identified as a low focus area. Finally, the remaining content areas (612B, 614C, and 616B) have been identified as non-focus areas. In an embodiment, after the high and low focus areas have been identified, these areas can be extracted and presented to user 92 in an optimal manner. To that end, FIG. 6B shows an example presentation of identified focus areas according to an embodiment of the invention. As shown, the high and low focus areas (612A, 614A, 614B, and 616A) are presented in an optimal manner so that the areas most likely relevant to the user are not overlaid or obstructed. In an embodiment, content areas may be repositioned, resized, and/or reshaped based on their likely relevance (i.e., calculated priority) to user 92 based on a full position of each focus area. In another embodiment, identified focus areas may be converged in a single user interface or dashboard (not shown) and presented to user 92.

In an embodiment, in the workflow context described in an example above, presentation component 80 may fade particular content in or out depending on an established workflow. As used herein, content may be faded out (e.g., decreased in size) or faded in (e.g., increased in size) based on a sequence represented in an established workflow. For example, content in Application A (as described above) may be faded out and content in Application C may be faded in when user 92 has focus on the content in Application B. Likewise, Application B may be faded out when user 92 has focus on content in Application C. In an embodiment, user 92 may alter a transition (e.g., keep from being faded out) by bringing attention (reading, clicking, hovering, etc.) over a portion of the content that is transitioning.

Figure 7:
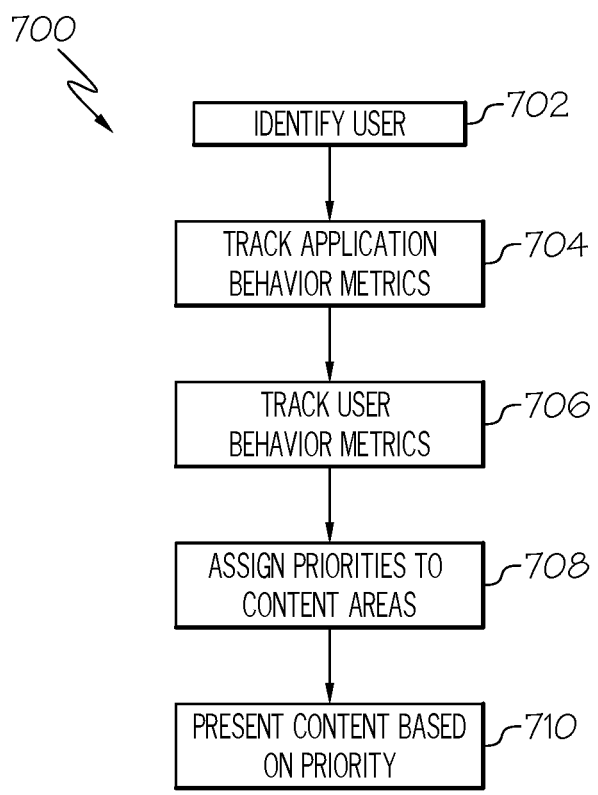
FIG. 7 depicts an example process flowchart according to an embodiment of the present invention.

Referring now to FIG. 7 in conjunction with FIG. 2, a process flowchart 700 according to an embodiment of the present invention is shown. At 702, user identification component 74 of system 72, as executed by computer system/server 12, identifies user 92 using user device 90. At 704, application analysis component 76, as executed by computer system/server 12, tracks one or more application behavior metrics of applications executing on user device 90. At 706, behavioral pattern analysis component 78 tracks one or more user behavior metrics based on a plurality of interactions (e.g., user focus, physical interactions such as typing, scrolling, etc.) related to content presented by the applications. At 708, presentation component 80, as executed by computer system/server 12, assigns a priority to each content area based on the collected application and user behavior metrics. At 710, presentation component 80 presents the one or more content areas based on the assigned priority and a full position of each focus area so that content likely relevant to user 92 (i.e., focus areas) is displayed in an optimal manner (e.g., not overlaid or obscured).

The process flowchart of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for optimizing a presentation of content on a display of a user device for an identified user, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for optimizing a presentation of content on a display of a user device for an identified user. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for optimizing a presentation of content on a display of a user device for an identified user. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/ (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for optimizing a presentation of content on a display of a user device for an identified user. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A system for optimizing an arrangement of content on a display of a user device, comprising:
 a memory medium comprising instructions;
 a bus coupled to the memory medium; and
 a processor coupled to the bus that when executing the instructions causes the system to perform a method, comprising:
 tracking, based on a plurality of applications executing on the user device, a set of application behavior metrics;
 tracking, based on a plurality of interactions between an identified user and the applications, a set of user behavior metrics to identify at least one focus area of content;
 displaying an application of the plurality of applications, the displayed application simultaneously displaying the at least one focus area of content and a remainder area in an application window that is dedicated to the displayed application, each focus area of the at least one focus area being a content area that makes up a non-entire portion of the displayed application, the remainder area not overlapping the at least one focus area, the application being an application-level program executing on the user device;
 detecting a first plurality of interactions between the user and the at least one focus area of content in the displayed application;
 determining that the interactions between the user and the at least one focus area of content have a first frequency;

detecting a second plurality of interactions between the user and the remainder area in the displayed application;

determining that the interactions between the user and the remainder area have a second frequency;

determining that the second frequency is less than the first frequency;

assigning a priority to the at least one focus area based on the set of application behavior metrics, the determined first and second frequencies and a heat map generated based on the set of user behavior metrics;

assigning a priority to the remainder area based on the set of application behavior metrics, the determined first and second frequencies and the heat map;

determining that the priority assigned to the remainder area is lower than the priority assigned to the at least one focus area based on a determination that the second frequency is less than the first frequency; and optimizing the display of the application, the optimization including presenting the at least one focus area in the display of the application while removing the remainder area from the display of the application based on the determination that the priority assigned to the remainder area is lower than the priority assigned to the at least one focus area wherein the presenting of the at least one focus area includes dividing content from a keyboard application into two non-contiguous keyboard sections that are displayed on opposite edges of the display of the user device so as not to obstruct an identified focus area of the at least one focus area.

2. The system of claim 1, wherein the presenting of the at least one focus area includes displaying a first focus area so that the first focus area is not overlaid by a second focus area or a non-focus area, wherein a priority of the first focus area is greater than a priority of the second focus area.

3. The system of claim 1, wherein the set of application behavior metrics includes a relationship coefficient between a first application and a second application, wherein the first application is dependent on the second application.

4. The system of claim 1, wherein the set of user behavior metrics is selected from a group consisting of: eye tracking, mouse tracking, pointer tracking, finger tracking, mouse scrolling, and keyboard strokes.

5. The system of claim 1, wherein the tracking of the set of user behavior metrics includes generating a user interaction map for at least one of the applications among the plurality of applications.

6. The system of claim 1, wherein the presenting of the at least one focus area includes performing an action selected from a group consisting of: resizing at least one of the focus areas, reshaping at least one of the focus areas, or changing a location of at least one of the focus areas.

7. The system of claim 1,
wherein the at least one focus area includes a first focus area that is a first content area in the application displayed in the application window and wherein the method further comprises displaying a second focus area that is a second content area in a second application that is displayed in a second application window, the second application being an application-level computer program executing on the user device; and
wherein the presenting of the at least one focus area includes presenting both the first focus area and the second focus area in a newly-created single dashboard window that contains the first focus area and the second focus area but does not include the remainder area.

8. A computer program product embodied in a computer readable storage medium that, when executed by a computer device, performs a method for optimizing an arrangement of content on a display of a user device, the method comprising:

tracking, based on a plurality of applications executing on the user device, a set of application behavior metrics;

tracking, based on a plurality of interactions between an identified user and the applications, a set of user behavior metrics to identify at least one focus area of content;

displaying an application of the plurality of applications, the displayed application simultaneously displaying the at least one focus area of content and a remainder area in an application window that is dedicated to the displayed application, each focus area of the at least one focus area being a content area that makes up a non-entire portion of the displayed application, the remainder area not overlapping the at least one focus area, the application being an application-level program executing on the user device;

detecting a first plurality of interactions between the user and the at least one focus area of content in the displayed application;

determining that the interactions between the user and the at least one focus area of content have a first frequency;

detecting a second plurality of interactions between the user and the remainder area in the displayed application;

determining that the interactions between the user and the remainder area have a second frequency;

determining that the second frequency is less than the first frequency;

assigning a priority to the at least one focus area based on the set of application behavior metrics, the determined first and second frequencies and a heat map generated based on the set of user behavior metrics;

assigning a priority to the remainder area based on the set of application behavior metrics, the determined first and second frequencies and the heat map;

determining that the priority assigned to the remainder area is lower than the priority assigned to the at least one focus area based on a determination that the second frequency is less than the first frequency; and optimizing the display of the application, the optimization including presenting the at least one focus area in the display of the application while removing the remainder area from the display of the application based on the determination that the priority assigned to the remainder area is lower than the priority assigned to the at least one focus area wherein the presenting of the at least one focus area includes dividing content from a keyboard application into two non-contiguous keyboard sections that are displayed on opposite edges of the display of the user device so as not to obstruct an identified focus area of the at least one focus area.

9. The program product of claim 8, wherein the presenting of the at least one focus area includes displaying a first focus area so that the first focus area is not overlaid by a second focus area or a non-focus area, wherein a priority of the first focus area is greater than a priority of the second focus area.

10. The program product of claim 8, wherein the set of application behavior metrics includes a relationship coefficient between a first application and a second application, wherein the first application is dependent on the second application.

11. The program product of claim 8, wherein the set of user behavior metrics is selected from a group consisting of: eye tracking, mouse tracking, pointer tracking, finger tracking, mouse scrolling, and keyboard strokes.

12. The program product of claim 8, wherein the tracking of the set of user behavior metrics includes generating a user interaction map for at least one of the applications among the plurality of applications.

13. The program product of claim 8, wherein the presenting of the at least one focus area includes performing an action selected from a group consisting of: resizing at least one of the focus areas, reshaping at least one of the focus areas, or changing a location of at least one of the focus areas.

14. The program product of claim 8
   wherein the at least one focus area includes a first focus area that is a first content area in the application displayed in the application window and wherein the method further comprises displaying a second focus area that is a second content area in a second application that is displayed in a second application window, the second application being an application-level computer program executing on the user device; and
   wherein the presenting of the at least one focus area includes presenting both the first focus area and the second focus area in a newly-created single dashboard window that contains the first focus area and the second focus area but does not include the remainder area.

* * * * *